(12) United States Patent
Hara

(10) Patent No.: US 12,189,537 B2
(45) Date of Patent: Jan. 7, 2025

(54) MEMORY SYSTEM THAT MANAGES UPDATE OF ADDRESS MAPPING INFORMATION AND METHOD FOR CONTROLLING THE SAME

(71) Applicant: Kioxia Corporation, Tokyo (JP)

(72) Inventor: Fumio Hara, Kamakura Kanagawa (JP)

(73) Assignee: Kioxia Corporation, Tokyo (JP)

( * ) Notice: Subject to any disclaimer, the term of this patent is extended or adjusted under 35 U.S.C. 154(b) by 22 days.

(21) Appl. No.: 18/176,926

(22) Filed: Mar. 1, 2023

(65) Prior Publication Data
US 2023/0418760 A1    Dec. 28, 2023

(30) Foreign Application Priority Data

Jun. 22, 2022  (JP) .................................. 2022-100631

(51) Int. Cl.
*G06F 12/02*     (2006.01)
*G06F 12/10*     (2016.01)
(52) U.S. Cl.
CPC .......... *G06F 12/10* (2013.01); *G06F 12/0246* (2013.01); *G06F 2212/214* (2013.01)
(58) Field of Classification Search
CPC .. G06F 12/0246; G06F 12/0868; G06F 12/10; G06F 2212/1016; G06F 2212/1032; G06F 2212/214; G06F 2212/284; G06F 2212/311; G06F 2212/312; G06F 2212/466; G06F 2212/7201; G06F 2212/7203
See application file for complete search history.

(56) References Cited

U.S. PATENT DOCUMENTS

| 2017/0220253 | A1  | 8/2017 | Kohara et al. |
| 2019/0056886 | A1  | 2/2019 | Nagarajan et al. |
| 2020/0034298 | A1  | 1/2020 | Benisty et al. |
| 2023/0093359 | A1* | 3/2023 | Segev .................. G06F 3/0679 711/154 |

\* cited by examiner

*Primary Examiner* — Larry T MacKall
(74) *Attorney, Agent, or Firm* — Kim & Stewart LLP

(57) ABSTRACT

A memory system includes a first memory, a second memory, and a controller. The controller is configured to store address mapping information in the first memory, store, in the second memory, a mapping update data that is generated each time data writing to the first memory is performed, and upon an amount of mapping update data that have not been transmitted to the host reaching a threshold, transmit the address mapping information in the first memory and the mapping update data in the second memory to the host and cause the host to store updated address mapping information in a third memory in the host. The controller is configured to perform address mapping using the address mapping information in the first memory and the mapping update data in the second memory when connection with the host is lost.

20 Claims, 13 Drawing Sheets

| Byte address | PBA | LBA |
|---|---|---|
| 0~3 | PBA #0 | LBA-0 |
| 4~7 | PBA #1 | LBA-1 |
| ... | ... | ... |
| 504~507 | PBA #126 | LBA-126 |
| 508~511 | PBA #127 | LBA-127 |

CONFIGURATION OF MANAGEMENT OF LUT

| LBA | PBA | TAG |

FIG. 4

| TAG | SIZE | SEQ | VF |

| LBA |

| PBA | BLOCK | WL | CHIP | PL | OFFSET |

FIG. 11

| LBA | PBA |

MEMORY SYSTEM THAT MANAGES UPDATE OF ADDRESS MAPPING INFORMATION AND METHOD FOR CONTROLLING THE SAME

CROSS-REFERENCE TO RELATED APPLICATION(S)

This application is based upon and claims the benefit of priority from Japanese Patent Application No. 2022-100631, filed Jun. 22, 2022, the entire contents of which are incorporated herein by reference.

FIELD

Embodiments described herein relate generally to a memory system and a method for controlling the same.

BACKGROUND

In the related art, a memory system such as a solid state drive (SSD) having a nonvolatile memory is known. As an example of a nonvolatile memory included in an SSD, a NAND flash memory (hereinafter, referred to as a NAND memory) is known. A memory system is configured to be connectable to a host.

A memory system manages a lookup table (LUT) that functions as a logical-to-physical address mapping information, which is a part of management information. The LUT is updated according to writing of data to a nonvolatile memory. The memory system may update the LUT by using a host memory buffer (HMB) provided in the host. When communication between the host and the memory system is interrupted in a state in which the host and the memory system are connected to each other, the memory system cannot access the HMB. When the memory system cannot access the LUT in the HMB, the memory system cannot store the LUT in the nonvolatile memory. Therefore, it is likely that the LUT is lost.

BRIEF DESCRIPTION OF THE DRAWINGS

FIG. 4 is a diagram illustrating a detailed configuration of the LUT update difference.

FIG. 11 is a diagram illustrating an LUT update difference nonvolatilized in a NAND memory.

DETAILED DESCRIPTION

Embodiments provide a memory system and a control method in which a normal operation can be continued, even when communication interruption between a host and a memory system occurs.

In general, according to an embodiment, a memory system includes a first memory, which is a nonvolatile memory, a second memory, and a controller. The controller is configured to store address mapping information in the first memory, store, in the second memory, a mapping update data that is generated each time data writing to the first memory is performed, and upon an amount of mapping update data that have not been transmitted to the host reaching a threshold, transmit the address mapping information in the first memory and the mapping update data in the second memory to the host and cause the host to store updated address mapping information in a third memory in the host based on the address mapping information and the mapping update data from the memory system. The controller is configured to perform address mapping using the address mapping information in the first memory and the mapping update data in the second memory when connection with the host is lost.

Hereinafter, a memory system and a control method according to embodiments are specifically described with reference to the drawings accompanied below. In addition, the present disclosure is not limited to the following embodiments.

First Embodiment

Figure 1:
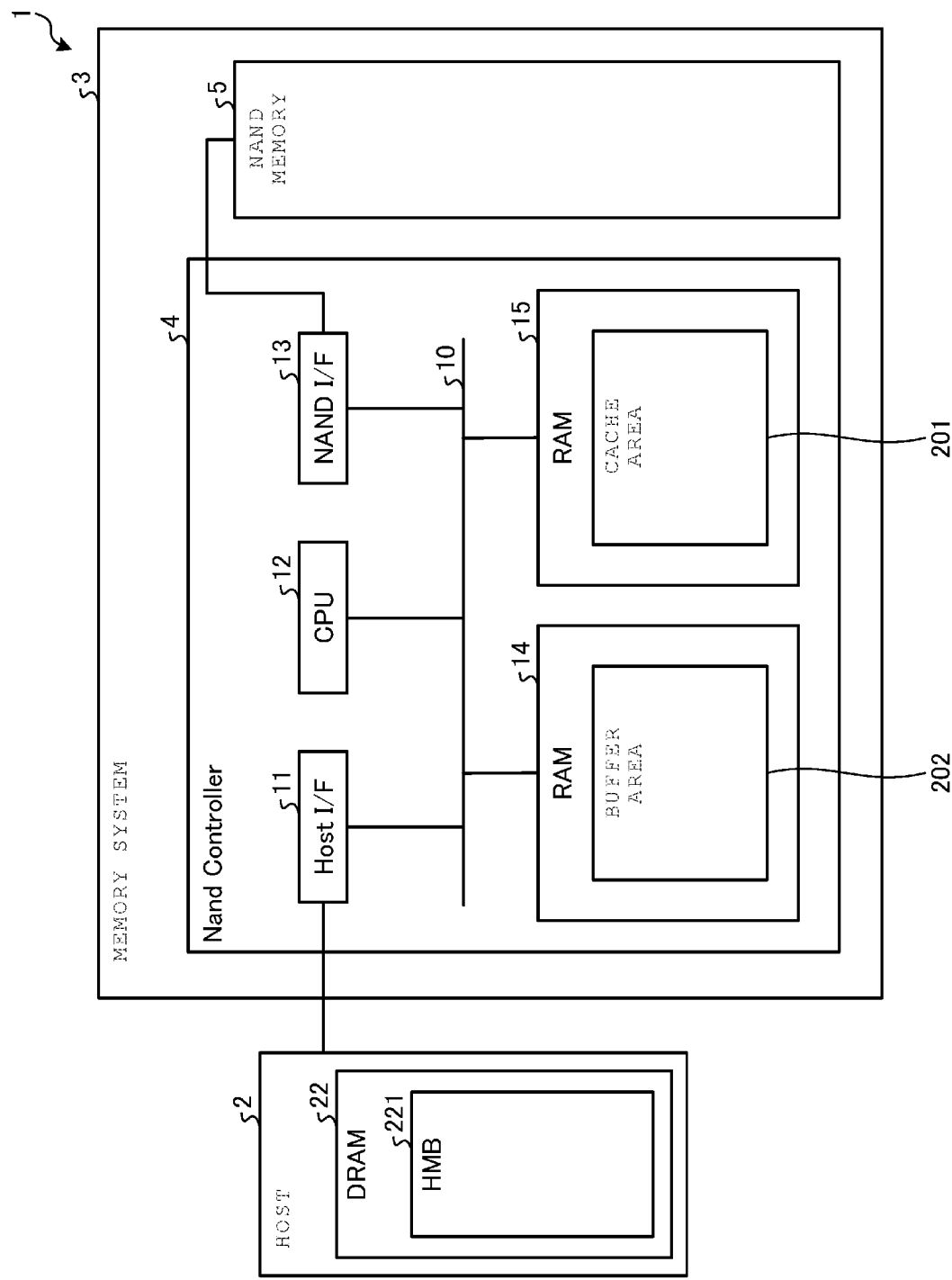
FIG. 1 is a block diagram illustrating a configuration of an information processing system including a memory system according to a first embodiment.

FIG. 1 is a block diagram illustrating a configuration of an information processing system 1 including a memory system 3 according to a first embodiment.

The information processing system 1 includes a host device 2 (hereinafter, referred to as a host) and the memory system 3. The host 2 is, for example, an information processing device. The host 2 may be a storage server that stores a large amount and various kinds of data in the memory system 3 or may be a personal computer.

As illustrated in FIG. 1, the memory system 3 as a storage device is a semiconductor storage device that is configured to write data to a nonvolatile memory such as a NAND flash memory (hereinafter, referred to as a NAND memory) 5, which is a first memory, and read data from the nonvolatile memory. The memory system 3 may be simply referred to as a storage device.

As illustrated in FIG. 1, the memory system 3 according to the present embodiment is implemented, for example, as a solid state drive (SSD) including a controller 4 and the NAND memory 5. In the following, a case where the memory system (that is, storage device) 3 is implemented as an SSD is exemplified, but the memory system 3 may be implemented as a hard disk drive (HDD). Otherwise, the memory system 3 may be a storage device in which the controller 4 and the NAND memory 5 are configured as one package.

The memory system 3 is used as a storage device of an information processing device that functions as the host 2. The memory system 3 may be built in the host 2 or may be connected to the host 2 via a cable or a network.

As an interface for connecting the host 2 and the memory system 3 to each other, SCSI, serial attached SCSI (SAS), ATA, serial ATA (SATA), PCI Express (PCIe)™, Ethernet™, fibre channel, a universal flash storage (UFS), and the like are used.

The host 2 includes a host RAM 22. Examples of the host RAM 22 include a dynamic RAM (DRAM). The DRAM is a memory that can be accessed faster than the NAND memory 5.

The controller 4 of the memory system 3 is implemented by a circuit such as a System-on-a-CHIP (SoC). The controller 4 controls the NAND memory 5.

The controller 4 includes a RAM 14 and a RAM 15, one or both of which may be referred to as a second memory. The RAMS 14 and 15 are schematically temporary storage areas for temporarily storing data to be used the controller 4. In addition, according to the present embodiment, the RAMS 14 and 15 are SRAMs but may be DRAMs. In addition, the RAMS 14 and 15 may be provided outside the controller 4. In this case, the controller 4 accesses to the RAMS 14 and via an interface provided in the controller 4.

The controller 4 allocates a buffer area 202 in the RAM 14. The buffer area 202 is an area for temporarily storing data to be written to the NAND memory 5 or data read from the NAND memory 5. In addition, the controller 4 allocates a cache area 201 in the RAM 15. The cache area 201 is allocated, for example, as a set associative (N-way) cache area. The cache area 201 is an area for temporarily storing a lookup table (LUT) that functions as a logical-to-physical address mapping table. The LUT manages mapping between logical addresses (for example, logical block addresses (LBA)) and physical addresses (PBA) of the NAND memory 5, respectively. The controller 4 updates the LUT according to the access to (for example, writing to or erasing from) the NAND memory 5. The controller 4 generates an LUT update difference (also referred to herein as LUT update data) described below according to the update of the LUT. The controller 4 may store other data different from the above data in the cache area 201 and the buffer area 202. The other data includes, for example, an LUT update difference.

In addition to the buffer area 202 or the cache area 201, the RAMS 14 and 15 may include storage areas of various kinds of data used for processes by the memory system 3 such as a security key (for example, an encryption/decryption key for encrypting and decrypting user data), firmware (FW) which is a control program executed by a CPU 12, and an operation log of the memory system 3. In addition, the user data is data that is designated to be written to the memory system 3 by the host 2 and is data designated by a write request (for example, a write command) from the host 2. The memory system 3 receives user data associate with the write request from the host 2 according to the reception of the write request from the host 2.

In addition, the RAMS 14 and 15 are not necessarily required to be separate units and may be an integrated unit as long as the cache area 201 and the buffer area 202 are separated for management.

The controller 4 further supports a host memory buffer (HMB) function. For example, the memory system 3 supports an HMB function conforming to NVM Express (NVMe)™ standard. The HMB function is a function for exclusively using at least a part of area allocated to the host RAM 22, for example, as a temporary storage area for storing the LUT, by the controller 4. The controller 4 can exclusively use a part of area of the host RAM 22 for the HMB function.

As the HMB function, Unified Memory Architecture (UMA), which is a type of memory architecture, may be applied. In this case, the memory system 3 can perform the HMB function by using a partial area in the host RAM 22 based on Unified Memory Extension (UME), which is a peripheral standard of the UFS standard by the communication with the host 2 conforming to the UFS standard.

In this manner, when the controller 4 supports the HMB function, NVMe including an HMB function or UFS including an HMB function by the UME is used as an interface for connecting the host 2 and the memory system 3 to each other. Alternatively, when it is acceptable to include the HMB function, as an interface for connecting the host 2 and the memory system 3 to each other, SCSI, Serial Attached SCSI (SAS), ATA, Serial ATA (SATA), PCI Express(PCIe) ™, Ethernet™, Fibre channel, and the like may be used.

The area of the host RAM 22 allocated to the controller 4 is also referred to as a host memory buffer (HMB) 221. From enablement to disablement of the HMB function, the controller 4 can use the HMB 221 of the host RAM 22 as a temporary storage area where a buffer area, a cache area, and storage areas of various kinds of data are provided, in the same manner as the RAMs 14 and 15 described above. For example, the controller 4 reads an LUT corresponding to data read from the NAND memory 5, from the NAND memory 5 and stores the LUT in the HMB 221. In addition, for example, when the memory system 3 starts up, the HMB function is disabled and is enabled according to the request from the host 2.

The controller 4 receives address information indicating one or more address ranges of the host RAM 22, together with the command for requesting to enable the HMB function, from the host 2. From the enablement to the disablement of the HMB function, according to the command and the address information, the controller 4 uses one or more areas respectively corresponding to the one or more address ranges, as the HMB 221.

Also, in the following, for easier understanding, storing (that is, temporarily storing) of data in the RAMS 14 and 15 or the HMB 221 may be referred to as "caching" regardless of the application such as caching or buffering. In addition, regardless of the application, the area in the RAMS 14 and 15 and the HMB 221 may be described as a "cache area".

The NAND memory 5 includes a plurality of blocks. Each block includes a plurality of pages. One block functions as a minimum erase unit. The block may be referred to as an "erase block" or a "physical block". Each page includes a plurality of memory cells connected to the same word line. One page is a unit of a data write operation and a data read operation. In addition, the word line may be a unit of a data write operation and a data read operation.

In addition, the controller 4 is electrically connected to the NAND memory 5 via a NAND interface 13 corresponding to an interface standard such as Toggle DDR or Open NAND Flash Interface (ONFI). The NAND interface 13 functions as a NAND control circuit configured to control the NAND memory 5. The NAND interface 13, for example, controls a NAND signal or issues a command.

The NAND interface 13 may be connected to a plurality of NAND memory chips in the NAND memory 5 via a plurality of channels (Ch), respectively. By driving the plurality of NAND memory chips in parallel, access to the NAND memory 5 can be broadbanded.

The controller 4 functions as a memory controller configured to control the NAND memory 5.

The controller 4 may function as a flash translation layer (FTL) configured to perform data management and block management of the NAND memory 5. The data management performed by the FTL includes (1) management of mapping information indicating the correspondence relationship between logical addresses and physical addresses of the NAND memory 5, (2) a process for concealing an operation of reading/writing of a page unit and erasing of a block unit, and the like. The logical address is an address used by the host 2 for address designation of the memory system 3. In the following, it is assumed that a logical block address (LBA) is used as this logical address.

The controller 4 manages the mapping between LBAs and physical addresses by using the LUT, which is management information. The controller 4 manages the mapping between the LBAs and the physical addresses in the management unit of a certain size, by using the LUT. A physical address corresponding to a certain LBA indicates a physical storage location of the NAND memory 5 in which data of the LBA is written. When the memory system 3 is powered on, the controller 4 may load the LUT from the NAND memory 5 to the RAMS 14 and 15 or the HMB 221 of the host RAM 22.

The data writing to one page can be performed once per program/erase cycle. When updating data corresponding to a certain LBA, the controller 4 writes update data not to a first physical storage location where the data corresponding to the LBA is currently stored but to a second physical storage location different from the first physical storage location. Also, by updating the LUT so as to associate the LBA with the second physical storage location, the controller 4 invalidates the pre-updated data stored in the first physical storage location.

The block management includes management of defective blocks, wear leveling, garbage collection (GC) (also referred to as "compaction"), and the like.

The controller 4 functioning as the FTL performs a process for embodying a function such as address conversion, wear leveling, and GC as described above. For that reason, the controller 4 is required to perform a process of reading and writing a large amount of data such as an LUT, system data including internal information of the controller 4, and fragmented user data, to the NAND memory 5. As a method of effectively handling the data, there is a method of reading data to a primary memory (such as SRAM or DRAM) faster than the NAND memory 5. However, the mounting of primary memories having a large capacity as the RAMs 14 and 15 causes the increase of the cost or size of the controller 4.

As a method of suppressing the increase of the capacities of the RAMs 14 and 15, the HMB function described above is used. By the HMB function, the controller 4 can make the process such as the FTL faster by using a part of the host RAM 22 as the temporary storage area, without increasing the capacities of the RAMs 14 and 15.

In addition to the NAND interface 13 and the RAMs 14 and 15, the controller 4 includes a host interface 11, the CPU 12, and the like. The host interface 11, the CPU 12, the NAND interface 13, and the RAMs 14 and 15 may be connected to each other via a bus 10.

The host interface 11 functions as a circuit that controls signals with the host 2 or issues a command. The host interface 11 operates conforming to NVM Express (NVMe)™.

For example, the host 2 transmits a command to enable the HMB function to the memory system 3 according to the switch of the user who uses the host 2, the powering-on of the host 2, or the transition of the memory system 3 from a power saving mode to a normal mode. This command is, for example, a Set Features command indicating enablement of the HMB function. In order to designate an area to be used as the HMB 221, the host 2 transmits the address information indicating one or more address ranges of the host RAM 22 to the memory system 3, together with this command.

Also, for example, before the user who uses the host 2 is switched, before the host 2 is powered off, or before the memory system 3 transitions from the normal mode to the power saving mode, the host 2 transmits a command to disable the HMB function to the memory system 3. This command is, for example, a Set Features command that indicates disablement of the HMB function. The memory system 3 transitions from the normal mode to the power saving mode for reducing the power consumption. For example, before the transition to the power saving mode, after data stored in a volatile memory such as the RAM 14 or 15 is written to the NAND memory 5, the memory system 3 stops the power supply to the volatile memory and the NAND memory 5. The memory system 3 that transitions to the power saving mode does not supply power to each unit except for a part of elements and thus can reduce the power consumption.

The host interface 11 sends a request indicating enablement of the HMB function to the CPU 12 according to the command to enable the HMB function. In addition, the host interface 11 sends address information for designating the area of the host RAM 22 used as the HMB 221 to the CPU 12. As a result, the HMB function is enabled by the CPU 12, so that the designated area is used as the HMB 221.

In addition, the host interface 11 sends a request indicating disablement of the HMB function to the CPU 12, according to the command to disable the HMB function. Therefore, the HMB function is disabled by the CPU 12.

From the enablement to the disablement of the HMB function, the host interface 11 further transmits the data to be cached to the HMB 221 to the host 2 or receives the data cached to the HMB 221 from the host 2. In other words, from the enablement to the disablement of the HMB function, the host interface 11 performs a process for caching the data to the HMB 221 and a process of reading data from the HMB 221. In addition, the data to be cached is data to be cached to the HMB 221 (or the RAM 14 or 15) by the controller 4 but is data that is not yet cached in practice.

The CPU 12 is a processor configured to control the host interface 11 and the NAND interface 13. The CPU 12 performs various processes by performing FW stored in a ROM (not illustrated) or the like. In addition to the process of the FTL described above, the CPU 12 can perform a command process for processing various commands from the host 2. The FW described above performed by the CPU 12 controls the operation of the CPU 12. Dedicated hardware in the controller 4 may perform a part or all of the FTL process and the command process.

Figures 2, 3:
FIG. 2 is a diagram illustrating a configuration of a management unit of an LUT.
FIG. 3 is a diagram illustrating a schematic configuration of an LUT update difference.

FIG. 2 is a diagram illustrating a configuration of a management unit of the LUT. As illustrated in FIG. 2, the LUT stores the physical address (PBA) of the NAND memory 5. The LUT is a table in which logical block addresses (LBA) and PBAs are correlated with each other.

The LBA is an address designated by a Write command, a Read command, or the like, from the host 2. The size of the management unit of the LUT is, for example, 512 bytes. As illustrated in FIG. 2, for example, PBA #0 is correlated with LBA-0. In this correlation, 4 bytes (0 to 3 bytes) are used. Accordingly, in order to manage 128 LBAs (LBA-0 to LBA-127), 4 bytes×128=512 bytes are used. The controller 4 manages (for example, updates or duplicates) the LUT with a management unit having the size of 512 bytes. The LUT configured in this manner is stored in the NAND memory 5, the RAM 14 or 15, or the HMB 221.

FIG. 3 is a diagram illustrating a schematic configuration of the LUT update difference. As illustrated in FIG. 3, the LUT update difference includes three items of information of LBA, PBA, and TAG and is information indicating update contents of logical-to-physical address mapping. The LBA is a logical address designated from the host 2. The PBA is a physical address of a write destination in the memory system 3. The TAG is management information related to correspondence between the LBA and the PBA. One LUT update difference has a sufficiently small size compared with the LUT managed in the management unit of 512 bytes. The LUT update difference configured in this manner is stored in the RAM 14 or 15.

FIG. 4 is a diagram illustrating a detailed configuration of the LUT update difference. As illustrated in FIG. 4, the TAG has information of SIZE, SEQ, and VF. The SEQ of 1 indicates that the LUT update difference is an Entry having a certain range, and the SEQ of 0 indicates that the LUT update difference is 1 Entry. The VF of 1 indicates that the LUT update difference is an enabled Entry, and the VF of 0 indicates that the LUT update difference is a disabled Entry. The SIZE indicates the size of the range of the LUT update difference (the number of Entries) in case of SEQ=1 and is disabled in case of SEQ=0.

The LBA indicates the leading LBA of the LUT update difference.

The PBA indicates the leading PBA of the LUT update difference. The PBA has information of OFFSET, PL, CHIP, WL, and BLOCK. The OFFSET indicates the location of the NAND memory 5 in PAGE. The PL indicates a Plane number of the NAND memory 5. The CHIP indicates a Chip number of the NAND memory 5. The WL indicates a Word Line number of the NAND memory 5. The BLOCK indicates a block number of the NAND memory 5.

Figure 5:
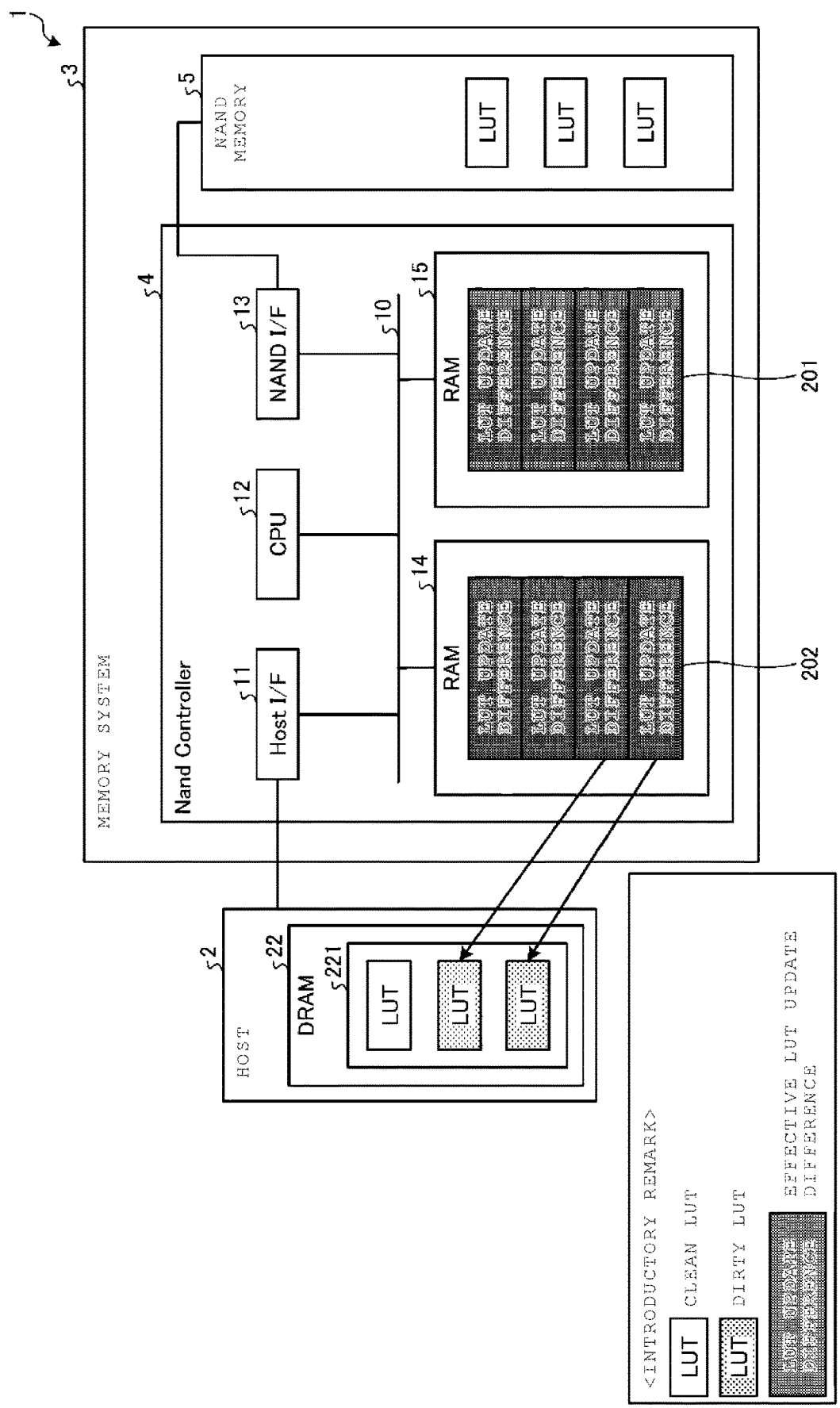
FIG. 5 is a block diagram illustrating an example in which LUTs and LUT update differences are stored in a host and the memory system according to the first embodiment.

FIG. 5 is a block diagram illustrating a storage example of the LUTs and the LUT update differences in the memory system 3 and the host 2. FIG. 5 indicates a state in which the LUT update differences are stored in the buffer area 202 of the RAM 14 and the cache area 201 of the RAM 15. As illustrated in FIG. 5, the HMB 221 includes a cache area of the LUTs. By providing the LUT cache area to the HMB 221, the cache area 201 of the RAM 15 can be used for storing not only the LUTs but also the LUT update differences. That is, the LUT update difference is stored by using the cache area 201 of the RAM 15 in addition to the buffer area 202 of the RAM 14. Here, a dirty LUT of the HMB 221 is an LUT to which the LUT update differences of the buffer area 202 and the cache area 201 have been reflected but which has not been stored the NAND memory 5, in the cache area of the HMB 221. In addition, a Clean LUT of the HMB 221 is an LUT to which the LUT update differences of the buffer area 202 and the cache area 201 have been reflected and which is stored in the NAND memory 5, in the cache area of the HMB 221. That is, the LUT update difference stored in the buffer area 202 and the cache area 201 may be reflected to the LUT of the HMB 221 or the LUT of the NAND memory 5.

Figure 6:
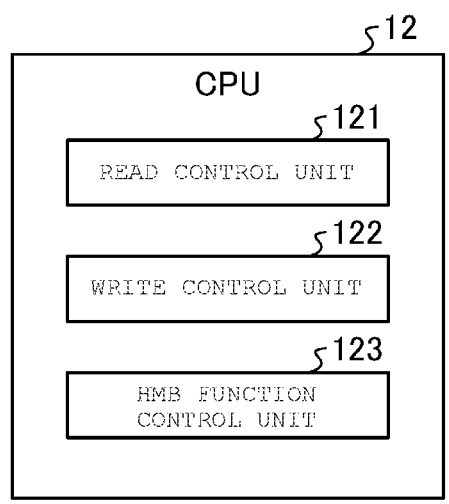
FIG. 6 is a functional block diagram illustrating functions implemented by a CPU of a controller.

Next, a function exhibited by the CPU 12 performing the FW is described. FIG. 6 is a functional block diagram illustrating functions implemented by the CPU 12 of the controller 4.

The CPU 12 functions, for example, as a read control unit 121, a write control unit 122, and an HMB function control unit 123.

The read control unit 121 reads, for example, the user data in accordance with the read command from the NAND memory 5. The read control unit 121 controls each unit in the controller 4 so that the read user data is cached to the RAM 14 or 15 or the HMB 221. That is, the read control unit 121 uses the RAMS 14 and 15 and the HMB 221 as read buffers for accumulating the read user data.

The write control unit 122 writes, for example, the user data received from the host 2 in accordance with the reception of the write command to the NAND memory 5. The write control unit 122 controls each unit in the controller 4 so that the user data to be written to the NAND memory 5 is cached to the RAM 14 or 15 or the HMB 221. That is, the write control unit 122 uses the RAMs 14 and and the HMB 221 as write buffers for accumulating the user data to be written.

The HMB function control unit 123 controls enablement and disablement of the HMB function. As described above, the host interface 11 sends the request indicating enablement of the HMB function and address information for designating the area used as the HMB 221, to the CPU 12. This address information includes a list indicating one or more address ranges of the host RAM 22.

The HMB function control unit 123 enables the HMB function according to the request indicating enablement of the HMB function. Also, the HMB function control unit 123 manages, as the HMB 221, one or more areas corresponding to one or more address ranges, respectively, from the enablement to the disablement of the HMB function, by using the address information indicating the one or more address ranges of the host RAM 22.

The HMB function control unit 123 uses, for example, HMB area management information in order to manage the HMB 221. The HMB area management information is cached, for example, to the RAM 14 or 15. In addition, the HMB area management information includes information (for example, a logical address) for identifying data cached in the HMB 221 and information (for example, a physical address) indicating a location (area) in the HMB 221 to which the corresponding data is cached.

In addition, as described above, the host interface 11 sends the request indicating disablement of the HMB function to the CPU 12. The HMB function control unit 123 disables the HMB function according to the request indicating disablement of the HMB function.

Next, a characteristic process by the controller 4 of the memory system 3 is described.

Figure 7:
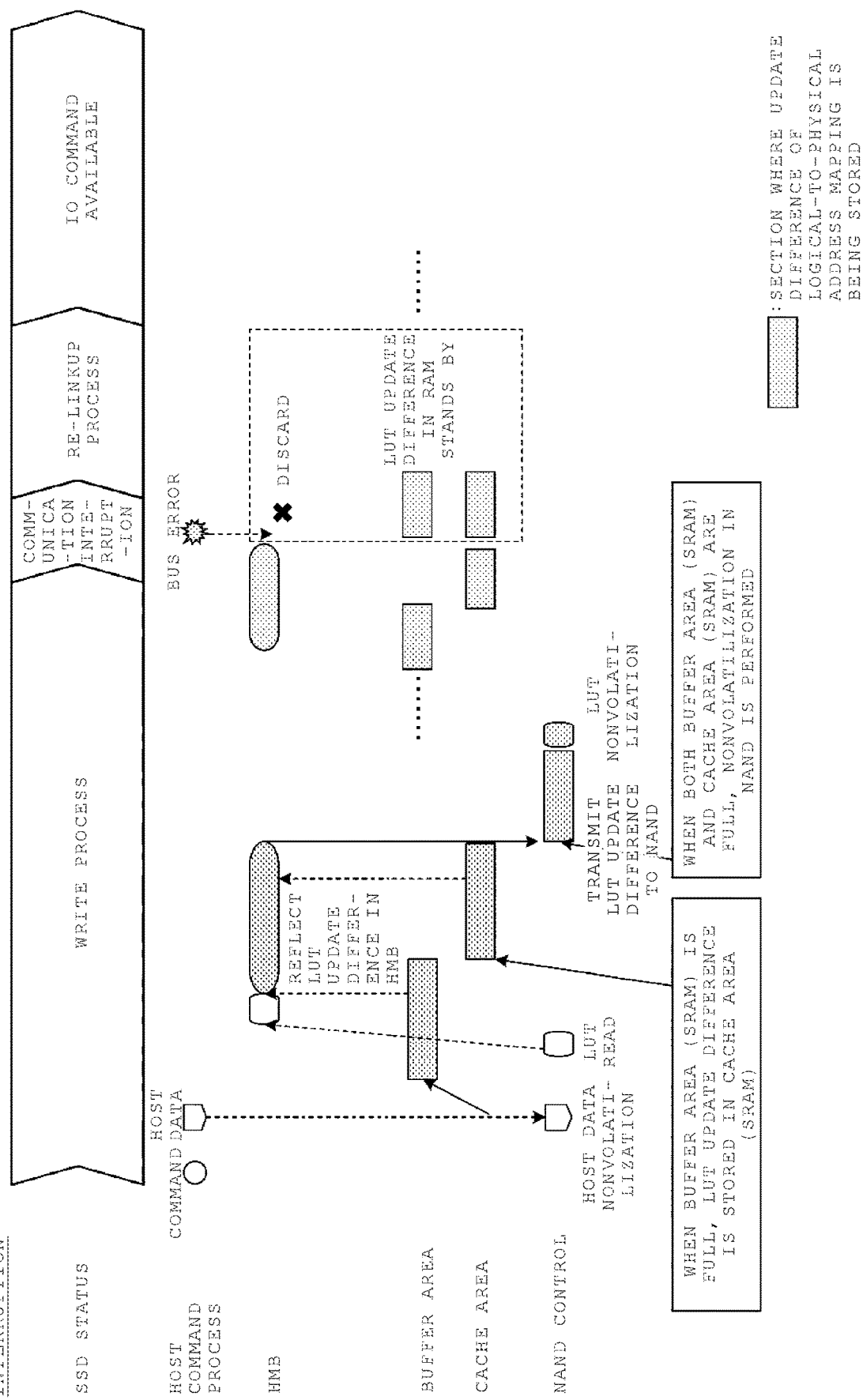
FIG. 7 is a diagram illustrating an example of data management including a case where communication interruption occurs during a write process in the memory system according to the first embodiment.
Figure 8:
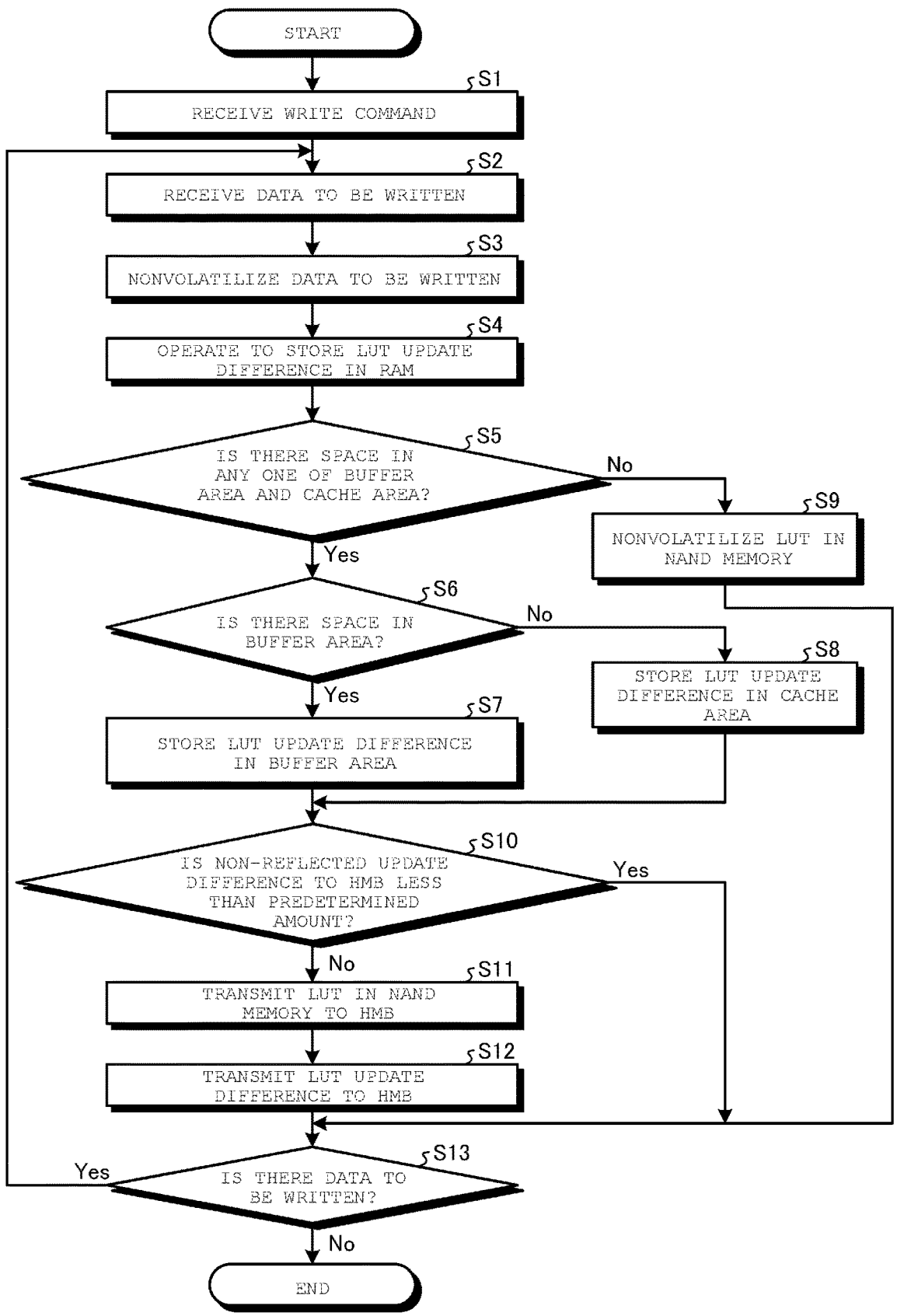
FIG. 8 is a flowchart illustrating a flow of a write process in the memory system according to the first embodiment.

Here, FIG. 7 is a diagram illustrating an example of data management when communication interruption occurs during a write process, and FIG. 8 is a flowchart illustrating a flow of the write process.

First, the write process is described. The write process is mainly controlled by the write control unit 122 by the CPU 12.

The CPU 12 receives a write command from the host 2 (S1) and also receives data to be written(Host data) that is user data received from the host 2 (S2). The CPU 12 writes the data to be written (Host data) to the NAND memory 5 to nonvolatilize the data (S3). Accordingly, the CPU 12 updates the LUT.

Next, the CPU 12 operates to store the LUT update difference corresponding to the update contents of the LUT to the RAM 14 or 15, which is the SRAM (S4).

Here, the CPU 12 determines that there is a space in any one of the buffer area 202 and the cache area 201 (S5). Here, the presence of a space in any one of the buffer area 202 and the cache area 201 indicates that there is an area required for storing the LUT update difference in any one of the areas.

When the CPU 12 determines that there is not a space in the buffer area 202 and the cache area 201 (No in S5), the process proceeds to S9, and the LUT to which the LUT update difference stored in the buffer area 202 and/or the cache area 201 has been reflected is nonvolatilized into the NAND memory 5. Thereafter, the process proceeds to S13.

That is, according to the present embodiment, when the buffer area 202 of the RAM 14 and the cache area 201 of the RAM 15 are FULL, the CPU 12 nonvolatilizes the LUT update difference stored in the buffer area 202 and/or the cache area 201 into the NAND memory 5. Specifically, the CPU 12 reflects the LUT update difference stored in the buffer area 202 and/or the cache area 201 to the LUT stored in the HMB 221 and stores the LUT in the NAND memory 5, to nonvolatilize the LUT update difference. The LUT update difference reflected to the LUT and nonvolatilized into the NAND memory 5 is invalidated in the buffer area 202 and/or the cache area 201. Therefore, a space is formed in the buffer area 202 and/or the cache area 201.

On the other hand, when the CPU 12 determines that there is a space in the buffer area 202 and the cache area 201 (Yes in S5), the process proceeds to S6, and the CPU 12 determines whether there is a space in the buffer area 202 of the RAM 14.

When the CPU 12 determines that there is not a space in the buffer area 202 of the RAM 14 (No in S6), the process proceeds to S8, and the LUT update difference is stored in the cache area 201 of the RAM 15. Thereafter, the process proceeds to S10.

That is, according to the present embodiment, when the buffer area 202 is FULL in the RAM 14, the CPU 12 stores the LUT update difference in the cache area 201 of the RAM 15.

On the other hand, when the CPU 12 determines that there is a space in the buffer area 202 of the RAM 14 (Yes in S6), the process proceeds to S7, and the LUT update difference is stored in the buffer area 202 of the RAM 14. Thereafter, the process proceeds to S10.

Next, in S10, the CPU 12 determines whether an LUT update difference that has not been reflected to the LUT of the HMB 221 among the LUT update differences in the RAMS 14 and 15 is less than a certain amount. The expression "the LUT update difference in the RAM 14 or 15 that has not been reflected to the LUT of the HMB 221" means that the LUT of the HMB 221 has not been updated with the LUT update difference in the RAM 14 or 15.

When the LUT update difference in the RAM 14 or 15 that has not been reflected to the LUT of the HMB 221 is less than the certain amount (Yes in S10), the process proceeds to S13.

On the other hand, when the LUT update difference in the RAM 14 or 15 that has not been reflected to the LUT of the HMB 221 is less than the certain amount (No in S10), the CPU 12 transmits the LUT that corresponds to the LUT update difference in the RAM 14 or 15 and is stored in the NAND memory 5 to the HMB 221 (S11). Further, the CPU 12 transmits the LUT update difference in the RAM 14 or 15 to the HMB 221 and writes the LUT update difference to the LUT of the HMB 221 (S12). Therefore, the LUT update difference in the RAM 14 or 15 is reflected (updated) to the LUT of the HMB 221. At this point, the RAMS 14 and 15 continue to store the LUT update difference transmitted to the HMB 221. Thereafter, the process proceeds to S13.

The CPU 12 repeats S2 to S13 described above until there is no newly received data to be written (Host data) (No in S13).

That is, as illustrated in FIGS. 7 and 8, even after the LUT of the HMB 221 is updated, while there is a space in any one of the buffer area 202 of the RAM 14 and the cache area 201 of the RAM 15, the CPU 12 does not invalidate the LUT update difference in the RAM 14 or 15 and continues to store the LUT update difference.

Figure 9:
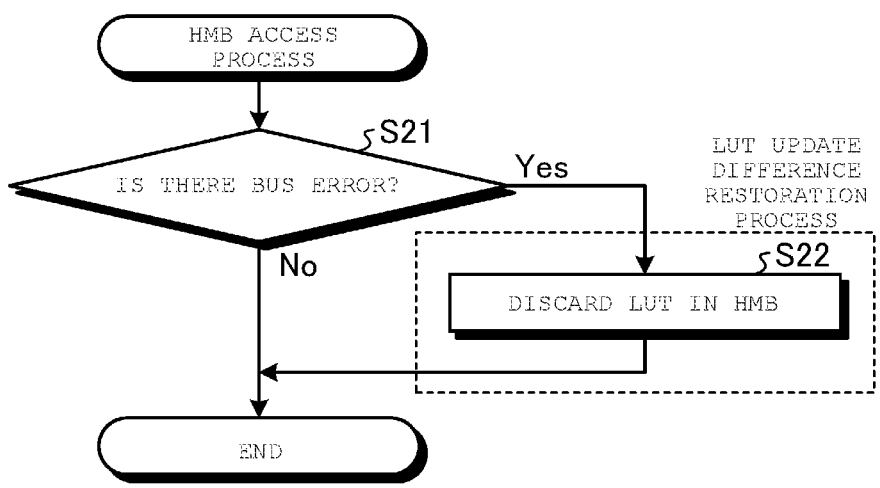
FIG. 9 is a flowchart illustrating a flow of an HMB access process of the memory system according to the first embodiment.

Next, the process when the communication interruption occurs during the write process is described by using FIGS. 7 and 9.

In case of the access to the HMB 221 in S11 described above, it is assumed that a bus error (HMB bus error) is detected.

Here, FIG. 9 is a flowchart illustrating a flow of the HMB access process. The HMB access process is mainly controlled by the write control unit 122 implemented by the CPU 12.

The CPU 12 determines whether the HMB bus error has occurred at a certain timing after the HMB bus error occurs (S21). When the HMB bus error has occurred (Yes in S21), the access to the HMB 221 is given up, and an LUT update difference restoration process is performed.

Specifically, when the HMB bus error has occurred (Yes in S21), the CPU 12 discards (i.e., disregards) the LUT on the HMB 221 (S22). Then, after the HMB bus error is resolved, for example, a re-linkup process is performed, the CPU 12 performs logical-to-physical address mapping by using the LUT update difference in the RAM 14 or 15 and the LUT of the NAND memory 5. The CPU 12 performs the process of reading data stored in the NAND memory 5, for example, by using the LUT update difference in the RAM 14 or 15 and the LUT of the NAND memory 5.

When the HMB bus error has not occurred (No in S21), the CPU 12 continues the write process described with reference to FIG. 8.

As described above, according to the present embodiment, when the communication interruption occurs due to the occurrence of the HMB bus error at the time of the access process to the HMB 221, the access to the HMB 221 is given up, and the LUT of the HMB 221 is disregarded. By disregarding the LUT of the HMB 221, a dirty LUT stored in the HMB 221 may be lost. Here, the expression "dirty" means a state in which the LUT stored in the HMB 221 reflects the update of a new Write command but has not been stored in the NAND memory 5. A LUT of the HMB 221 that is a dirty LUT can be restored by the LUT stored in the NAND memory 5 and the LUT update difference in the RAM 14 or 15. Accordingly, the dirty LUT may be restored at appropriate timing in accordance with the reception of the Write command from the host 2 or the like.

The nonvolatilization of the LUT update difference in the RAM 14 or 15 is not essential at the time of the occurrence of the HMB bus error. For example, the LUT update difference in the RAM 14 or 15 may nonvolatilized in the NAND memory 5 at the timing when the RAMs 14 and 15 are powered down due to the transition to the power saving mode.

With the above, according to the first embodiment, a period when the newest information (LUT update difference) of the LUT under the control of the memory system 3 is only on the HMB 221 can be eliminated. By providing the cache area of the LUT to the HMB 221, the cache area 201 of the RAM 15 can be used for storing not only the LUT but also the LUT update difference. In addition to the buffer area 202 of the RAM 14, the LUT update difference that can be stored by using the cache area 201 of the RAM 15 can be greatly increased.

In this manner, with the memory system according to the first embodiment, after the LUT of the host memory buffer is updated with the LUT update difference in the buffer area and/or cache area provided in the memory system together with writing the LUT to the host memory buffer, the LUT update difference in the buffer area and/or cache area is continued to be stored. Accordingly, even when the communication interruption between the host and the memory system occurs, the LUT of the host memory buffer can be restored with the LUT update difference in the buffer area and/or the cache area in the memory system and the LUT of the NAND memory. Therefore, even when the communication between the host and the memory system is interrupted, the operation can be continuously performed without a transition to a failure mode. In addition, even when the communication between the host and the memory system is interrupted, the LUT of the host memory buffer can be restored, and thus the random access process by using the host memory buffer with a relatively large capacity as a cache of the LUT can be made faster.

Second Embodiment

Next, a second embodiment is described.

The second embodiment is different from the first embodiment, in that the LUT update difference is nonvolatilized into the NAND memory 5. Hereinafter, in the description of the second embodiment, the description of the same aspects as those of the first embodiment is omitted or simplified, and aspects different from those of the first embodiment are described.

Figure 10:
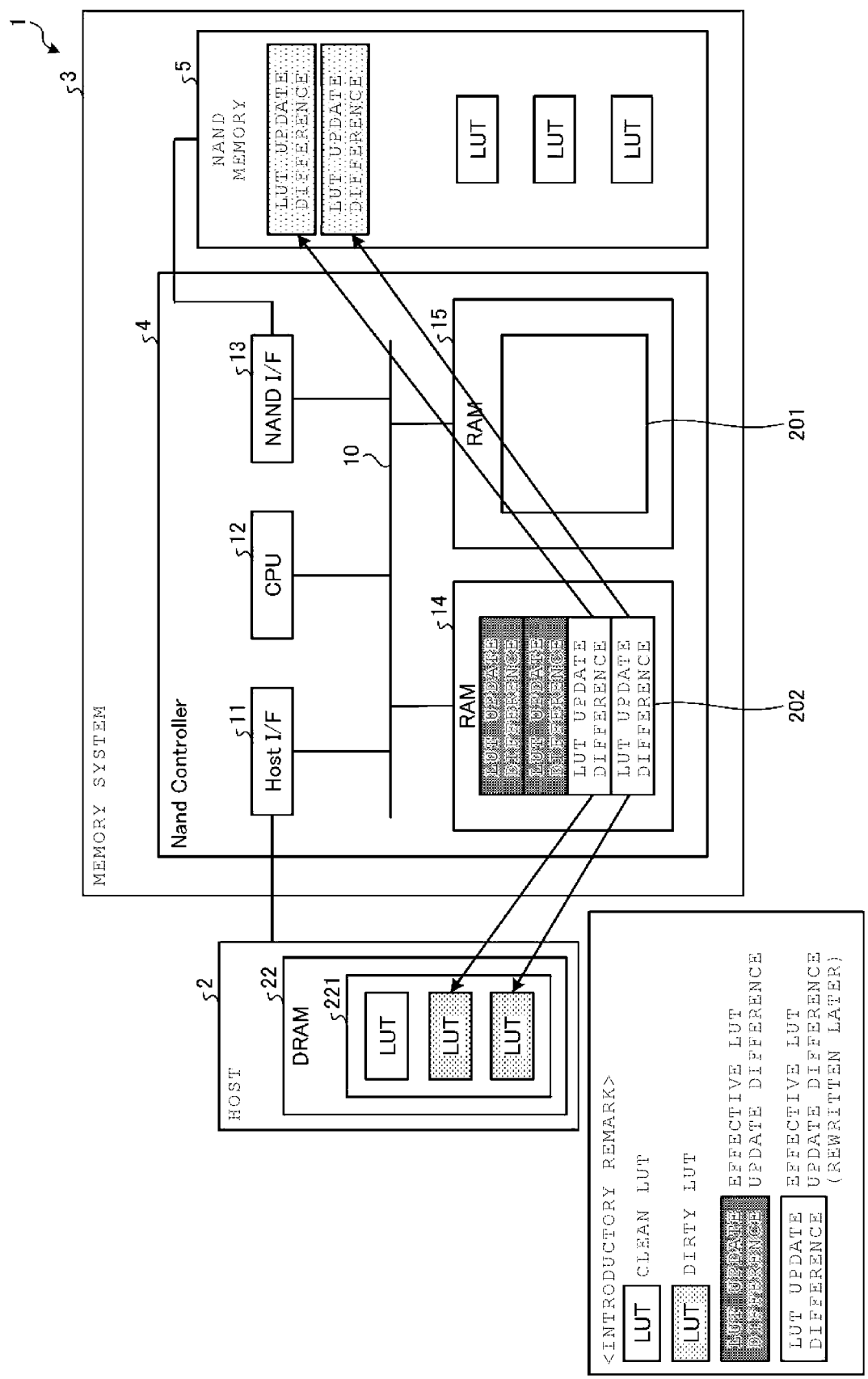
FIG. 10 is a block diagram illustrating an example in which LUTs and LUT update differences are stored in a host and a memory system according to a second embodiment.

FIG. 10 is a block diagram illustrating an example in which LUTs and LUT update differences are stored in the memory system 3 and the host 2 according to the second embodiment. As illustrated in FIG. 10, according to the present embodiment, a part of the LUT update difference in the RAM 14 is nonvolatilized into the NAND memory 5 and is also reflected to the LUT of the HMB 221. In FIG. 10, an LUT of the HMB 221 to which the LUT update difference in the RAM 14 has been reflected is indicated as a dirty LUT. The dirty LUT is nonvolatilized into the NAND memory 5 according to a certain condition. In the RAM 14, the LUT update difference that has been reflected to the LUT of the HMB 221 together with the nonvolatilization into the NAND memory 5 may be thereafter invalidated. In FIG. 10, the LUT update difference that has been nonvolatilized into the NAND memory 5 and reflected to the LUT of the HMB 221 is indicated as an invalidated LUT update difference. In addition, another part of the LUT update difference in the RAM 14 is nonvolatilized into the NAND memory 5 without being reflected to the corresponding LUT. In FIG. 10, this LUT update difference is indicated as an enabled LUT update difference.

Figure 11:
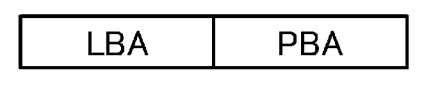

FIG. 11 is a diagram illustrating an LUT update difference nonvolatilized into the NAND memory 5. As illustrated in FIG. 11, the LUT update difference nonvolatilized into the NAND memory 5 is information in which the LBA and PBA are correlated with each other. The LBA is a logical address as a write destination designated by the host 2. The PBA is a physical address as a write destination in the memory system 3. The LUT update difference nonvolatilized into the NAND memory 5 illustrated in FIG. 11 does not require a TAG to the LUT update difference in the RAM 14 illustrated in FIG. 3.

Next, a characteristic process by the controller 4 of the memory system 3 is described.

Figure 12:
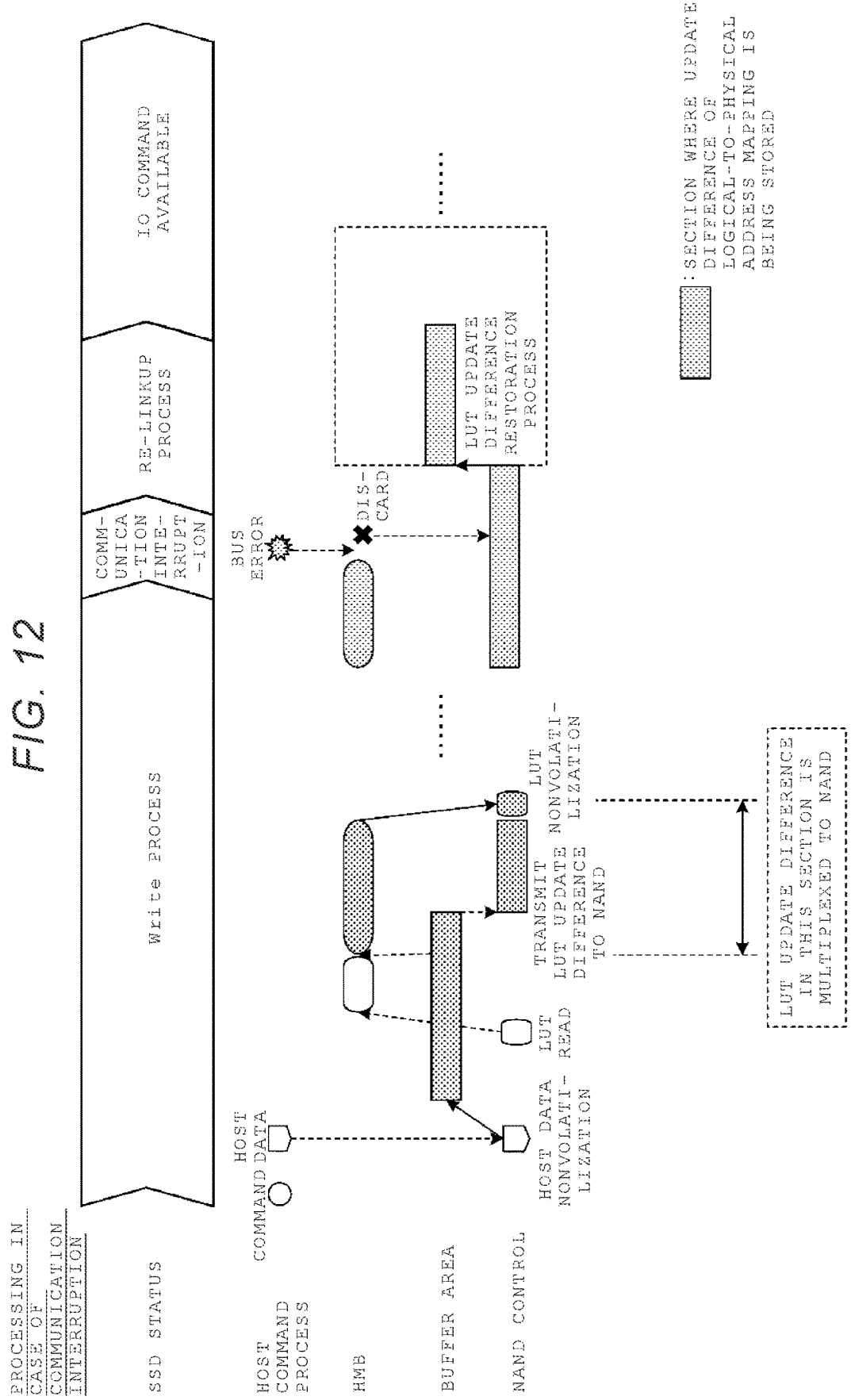
FIG. 12 is a diagram illustrating an example of data management including a case where communication interruption occurs during a write process in the memory system according to the second embodiment.
Figure 13:
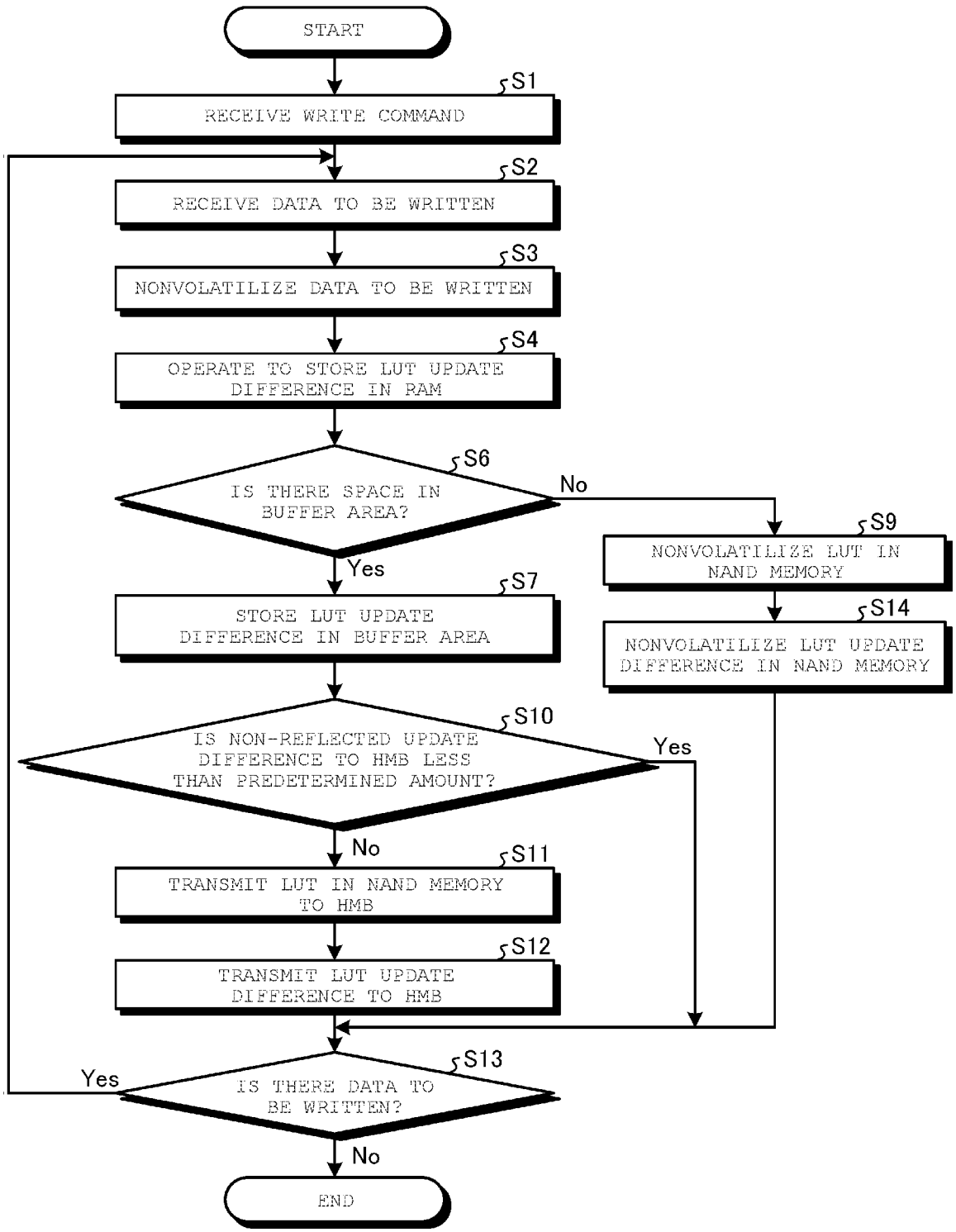
FIG. 13 is a flowchart illustrating a flow of a write process in the memory system according to the second embodiment.

Here, FIG. 12 is a diagram illustrating an example of data management including a case where communication interruption occurs during the write process, and FIG. 13 is a flowchart illustrating a flow of the write process.

First, the write process is described. The write process is mainly controlled by the write control unit 122 implemented by the CPU 12. In FIG. 13, process steps that are the same as those of the write processes according to the first embodiment described with reference to FIG. 8 are denoted by the same reference numeral, and the description thereof is omitted or simplified.

The CPU 12 receives the write command from the host 2 (S1) and also receives data to be written (Host data) (S2). The CPU 12 nonvolatilizes data to be written (Host data) (S3).

Next, the CPU 12 operates to store the LUT update difference in the buffer area 202 of the RAM 14 (S4).

Here, the CPU 12 determines whether there is a space in the buffer area 202 of the RAM 14 (S6). Here, the presence of a space in the buffer area 202 indicates that there is an area required for storing the LUT update difference in the buffer area 202.

When the CPU 12 determines that there is not a space in the buffer area 202 of the RAM 14 (No in S6), among LUTs of the HMB 221, an LUT to which a part of LUT update difference in the buffer area 202 has been reflected is nonvolatilized into the NAND memory 5 (S9). Additionally, among the LUT update differences of the buffer area 202, the CPU 12 nonvolatilizes the LUT update difference reflected to the LUT of the HMB 221 into the NAND memory 5 (S14). Thereafter, the process proceeds to S13. The LUT update difference reflected to the LUT of the HMB 221 and nonvolatilized into the NAND memory 5 is invalidated in the buffer area 202. Therefore, a space is formed in the buffer area 202.

That is, according to the present embodiment, when the buffer area 202 is FULL in the RAM 14, the CPU 12 nonvolatilizes the LUT update difference stored in the buffer area 202 into the NAND memory 5. Specifically, the CPU 12 reflects the LUT update difference stored in the buffer area 202 to the LUT stored in the HMB 221 and nonvolatilizes the LUT into the NAND memory 5. In addition, the CPU 12 nonvolatilizes the LUT update difference updated to the LUT of the HMB 221 into the NAND memory 5. The CPU 12 may also nonvolatilize the LUT update difference that has not been updated to the LUT of the HMB 221 into the NAND memory 5.

On the other hand, when the CPU 12 determines that there is a space in the buffer area 202 of the RAM 14 (Yes in S6), the LUT update difference is stored in the buffer area 202 (S7). Thereafter, the process proceeds to S10. The processes of S10 to S13 in FIG. 13 are the same as the processes of S10 to 13 in FIG. 8.

Figure 14:
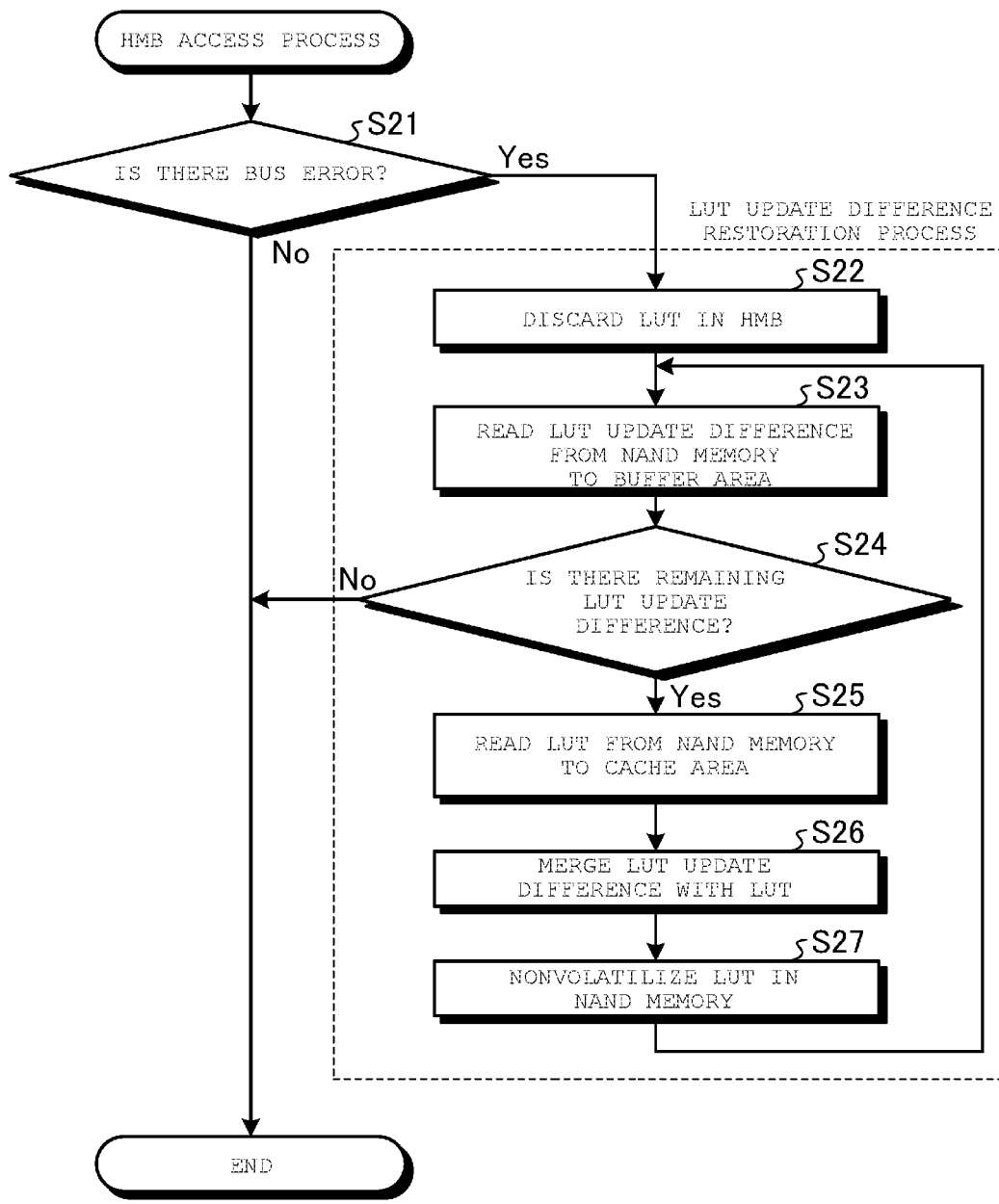
FIG. 14 is a flowchart illustrating a flow of an HMB access process in the memory system according to the second embodiment.

Next, processes when communication interruption occurs during the write process are described by using FIGS. 12 and 14.

In case of the HMB access in S11 described above, it is assumed that a bus error is detected.

Here, FIG. 14 is a flowchart illustrating a flow of an HMB access process. The HMB access process is mainly controlled by the write control unit 122 implemented by the CPU 12.

The CPU 12 determines whether an HMB bus error has occurred at a certain timing after the HMB bus error occurs (S21). When the HMB bus error has occurred (Yes in S21), an access to the HMB 221 is given up, and an LUT update difference restoration process is performed.

Specifically, when the HMB bus error has occurred (Yes in S21), the CPU 12 discards the LUT on the HMB 221 (S22). In the following, after the HMB bus error is resolved, for example, according to the performance of the re-linkup process, the CPU 12 performs the LUT update difference restoration process.

Next, the CPU 12 reads the LUT update difference from the NAND memory 5 to the buffer area 202 of the RAM 14 (S23). The reading of the LUT update difference from the NAND memory 5 to the buffer area 202 is the same as the storage of the LUT update difference read from the NAND memory 5 in the buffer area 202.

Next, the CPU 12 determines whether there is a remaining LUT update difference in the NAND memory 5 (S24). The remaining LUT update difference in the NAND memory 5 indicates that an LUT update difference that has not been stored yet in the buffer area 202 remains in the NAND memory 5. For example, when there is no area for storing an LUT update difference stored in the NAND memory 5 in the buffer area 202, there may be a remaining LUT update difference in the NAND memory 5.

When there is no remaining LUT update difference in the NAND memory 5 (No in S24), the CPU 12 ends the process.

On the other hand, when there is a remaining LUT update difference in the NAND memory 5 (Yes in S24), the CPU 12 reads the LUT from the NAND memory 5 to the cache area 201 of the RAM 15 (S25). The reading of the LUT from the NAND memory 5 to the cache area 201 is the same as the storage of the LUT read from the NAND memory 5 to the cache area 201. Next, the CPU 12 updates the LUT of the cache area 201 with the LUT update difference in the buffer area 202 of the RAM 14 (S26), also nonvolatilizes the updated LUT into the NAND memory 5 (S27), and the process returns to S23.

The CPU 12 repeats S23 to S27 described above until there is no remaining LUT update difference (No in S24). S26 to S27 may be collectively performed when the number of LUT update differences to be updated to the LUT reaches a certain number.

When the HMB bus error has not occurred (No in S21), the CPU 12 continues the write process described with reference to FIG. 13.

As described above, the present embodiment is the same as the first embodiment in that the LUT of the HMB 221 is discarded in case of the access process to the HMB 221. According to the present embodiment, when the LUT update difference nonvolatilized into the NAND memory 5 becomes the size that cannot be located in the RAM 14, the dirty LUT that has been stored in the HMB 221 is restored with the LUTs of the NAND memory 5 and the LUT update differences and nonvolatilized into the NAND memory 5. Therefore, the amount of the LUT update differences can be reduced.

A nonvolatilization timing of the LUT update difference in the buffer area 202 of the RAM 14 may be determined by optimizing the performance of the memory system 3, and the LUT update difference on the RAM 14 may be collectively nonvolatilized.

Each of various functions described in the present embodiment may be implemented by a circuit (processing circuit). Examples of processing circuit include programmed processors such as a central processing unit (CPU). The processor performs each of the described functions by executing computer programs (instructions) stored in a memory. The processor may be a microprocessor including an electrical circuit. Examples of the processing circuit also include a digital signal processor (DSP), an application specific integrated circuit (ASIC), a microcontroller, a controller, and other electrical circuit components. Each of the components other than the CPU described in the present embodiment may also be implemented by the processing circuit.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a first memory, which is a nonvolatile memory;
   a second memory; and
   a controller configured to:
   store address mapping information in the first memory;
   store, in the second memory, a mapping update data that is generated each time data writing to the first memory is performed;
   upon an amount of mapping update data that have not been transmitted to the host reaching a threshold, transmit the address mapping information in the first memory and the mapping update data in the second memory to the host and cause the host to store updated address mapping information in a third memory in the host based on the address mapping information and the mapping update data from the memory system;
   perform address mapping using the address mapping information in the first memory and the mapping update data in the second memory, when connection with the host is lost; and
   when the second memory does not have sufficient vacancy:
   control the host to transmit the updated address mapping information in the third memory to the memory system; and
   update the address mapping information in the first memory using the updated address mapping information from the host and one or more mapping update data that have not been transmitted to the host.

2. The memory system according to claim 1, wherein the second memory keeps storing the mapping update data in the second memory after the mapping update data are transmitted to the host.

3. The memory system according to claim 1, wherein the controller is further configured to invalidate the mapping update data in the second memory after the address mapping information in the first memory is updated.

4. The memory system according to claim 1, wherein the controller is further configured to, when the second memory does not have sufficient vacancy:
  store, in the first memory, the mapping update data that have been transmitted to the host.

5. The memory system according to claim 4, wherein the controller is further configured to invalidate the mapping update data in the second memory that have been stored in the first memory.

6. The memory system according to claim 1, wherein the controller no longer uses the updated address mapping information in the third memory of the host for address mapping after the connection with the host is lost.

7. The memory system according to claim 1, wherein the address mapping information is not stored in the second memory.

8. The memory system according to claim 1, wherein the controller is further configured to perform an operation to restore address mapping information in the third memory after connection with the host is recovered.

9. The memory system according to claim 8, wherein the controller, during the operation to restore, transmit the address mapping information in the first memory and the mapping update data in the second memory to the host.

10. The memory system according to claim 1, wherein
  the memory system is configured to operate in a first mode and a second mode in accordance with commands from the host, and
  the controller transmits the address mapping information in the first memory and the mapping update data in the second memory to the host during the first mode, but not during the second mode.

11. The memory system according to claim 10, wherein the controller is further configured to update the address mapping information in the first memory using the mapping update data in the second memory when an operation mode of the memory system transitions from the first mode to the second mode.

12. The memory system according to claim 1, wherein the first memory comprises a NAND flash memory.

13. A method for controlling a memory system including a first memory, which is a nonvolatile memory, and a second memory, comprising:
  storing address mapping information in the first memory;
  storing, in the second memory, a mapping update data that is generated each time data writing to the first memory is performed;
  upon an amount of mapping update data that have not been transmitted to the host reaching a threshold, transmitting the address mapping information in the first memory and the mapping update data in the second memory to the host and causing the host to store updated address mapping information in a third memory in the host based on the address mapping information and the mapping update data from the memory system;
  when connection with the host is lost, performing address mapping using the address mapping information in the first memory and the mapping update data in the second memory; and
  when the second memory does not have sufficient vacancy:
    controlling the host to transmit the updated address mapping information in the third memory to the memory system; and
    updating the address mapping information in the first memory using the updated address mapping information from the host and one or more mapping update data that have not been transmitted to the host.

14. The method according to claim 13, wherein the mapping update data keep stored in the second memory after the mapping update data are transmitted to the host.

15. The method according to claim 13, further comprising:
  invalidating the mapping update data in the second memory after the address mapping information in the first memory is updated.

16. The method according to claim 13, further comprising, when the second memory does not have sufficient vacancy:
  storing, in the first memory, the mapping update data that have been transmitted to the host.

17. The method according to claim 16, further comprising:
  invalidating the mapping update data in the second memory that have been stored in the first memory.

18. The method according to claim 13, wherein the updated address mapping information in the third memory of the host is no longer used for address mapping after the connection with the host is lost.

19. The method according to claim 13, further comprising:
  after connection with the host is recovered, performing an operation to restore address mapping information in the third memory, which comprises: transmitting the address mapping information in the first memory and the mapping update data in the second memory to the host.

20. The method according to claim 13, wherein the first memory comprises a NAND flash memory.

* * * * *